(12) United States Patent
Marowsky-Bree et al.

(10) Patent No.: US 8,903,917 B2
(45) Date of Patent: Dec. 2, 2014

(54) SYSTEM AND METHOD FOR IMPLEMENTING A CLUSTER TOKEN REGISTRY FOR BUSINESS CONTINUITY

(75) Inventors: Lars Marowsky-Bree, Hamburg (DE); Andrew John Beekhof, Hallbergmoos (DE)

(73) Assignee: Novell, Inc., Provo, UT (US)

( * ) Notice: Subject to any disclaimer, the term of this patent is extended or adjusted under 35 U.S.C. 154(b) by 1031 days.

(21) Appl. No.: 12/477,364

(22) Filed: Jun. 3, 2009

(65) Prior Publication Data

US 2010/0312915 A1 Dec. 9, 2010

(51) Int. Cl.
| | |
|---|---|
| *G06F 15/16* | (2006.01) |
| *G06F 15/177* | (2006.01) |
| *H04L 29/08* | (2006.01) |
| *G06F 11/20* | (2006.01) |
| *H04L 29/14* | (2006.01) |
| *G06F 11/14* | (2006.01) |

(52) U.S. Cl.
CPC ........ *H04L 67/1097* (2013.01); *G06F 11/2035* (2013.01); *H04L 67/1004* (2013.01); *H04L 69/40* (2013.01); *G06F 11/1425* (2013.01)
USPC ............................ 709/205; 709/221; 709/225

(58) Field of Classification Search
USPC .................................................. 709/203–205
See application file for complete search history.

(56) References Cited

U.S. PATENT DOCUMENTS

| | | | |
|---|---|---|---|
| 6,449,641 B1 * | 9/2002 | Moiin et al. ................... | 709/220 |
| 7,325,046 B1 * | 1/2008 | Novaes et al. ................ | 709/220 |
| 2002/0049845 A1 * | 4/2002 | Sreenivasan et al. ......... | 709/223 |
| 2007/0033205 A1 * | 2/2007 | Pradhan ........................ | 707/100 |
| 2008/0126829 A1 | 5/2008 | Robertson et al. | |

\* cited by examiner

*Primary Examiner* — Patrice Winder
(74) *Attorney, Agent, or Firm* — Haynes and Boone, LLP

(57) ABSTRACT

Method and system for implementing a cluster token registry ("CTR") process in a cluster comprising a plurality of interconnected nodes each having a CTR associated therewith are described. In one embodiment, the method comprises, responsive to a client signing in at one of the nodes, the client registering a cluster-wide token with the CTR of the node, thereby casting a vote in connection with the token; determining whether prerequisites for granting the token have been met; and, responsive to a determination that the prerequisites have been met, granting the token. The method further comprises periodically determining whether the vote in connection with the token vote has been refreshed by the client and, responsive to a determination that the vote in connection with the token has not been refreshed by the client, de-registering the client.

20 Claims, 3 Drawing Sheets

US 8,903,917 B2

SYSTEM AND METHOD FOR IMPLEMENTING A CLUSTER TOKEN REGISTRY FOR BUSINESS CONTINUITY

BACKGROUND

The realities of the current economic and business environment dictate that organizations must have in place a strong Business Continuity Plan ("BCP") to ensure that, in the event of a man-made or natural disaster, the operations and activities of the organization can continue with little to no interruption. In general, a well-designed BCP specifies how an organization will recover and restore partially or completely interrupted critical functions within a predetermined time after a disruption.

Business Continuity Clustering ("BCC") ensures that in the event of an isolated server problem or even a severe calamity, an organization's systems function normally and without noticeable service interruption. BCC connects and synchronizes independent, often geographically dispersed, clusters of servers, or nodes. If a data center's cluster fails for any reason, the other clusters assume the workload thereof to ensure non-stop access to mission-critical data and resources. In short, BCC provides synchronization among geographically dispersed clusters; however, BCC does not provide managerial functions for individual resources per se. In other words, in BCC, when a primary cluster fails, the entire operations of the primary cluster are moved to one or more secondary clusters without regard to the particular resources being employed. In the case of split-site clusters, the cluster at each site generally needs only to determine whether it is authorized to take over the resources at the remote site. Normally, clusters perform only local decisions based on a "quorum" concept.

SUMMARY

One embodiment is a cluster token registry ("CTR") process for use in a cluster comprising a plurality of interconnected nodes each having a CTR associated therewith. The process comprises, responsive to a client signing in at one of the nodes, the client registering a cluster-wide token with the CTR of the node, thereby casting a vote in connection with the token; determining whether prerequisites for granting the token have been met; and, responsive to a determination that the prerequisites have been met, granting the token. The process further comprises periodically determining whether the vote in connection with the token vote has been refreshed by the client and, responsive to a determination that the vote in connection with the token has not been refreshed by the client, de-registering the client.

DETAILED DESCRIPTION

To better illustrate the advantages and features of the embodiments, a particular description of several embodiments will be provided with reference to the attached drawings. These drawings, and other embodiments described herein, only illustrate selected aspects of the embodiments and are not intended to limit the scope thereof. Further, despite reference to specific features illustrated in the example embodiments, it will nevertheless be understood that these features are not essential to all embodiments and no limitation of the scope thereof is thereby intended. Any alterations and further modifications in the described embodiments, and any further applications of the principles of the embodiments as described herein are contemplated as would normally occur to one skilled in the art. Furthermore, some items are shown in a simplified form, and inherently include components that are well known in the art. Further still, some items are illustrated as being in direct connection for the sake of simplicity and clarity. Despite the apparent direct connection, it is understood that such illustration does not preclude the existence of intermediate components not otherwise illustrated.

One embodiment comprises a cluster token registry process ("CTR"). As previously noted, normally, clusters perform only local decisions based on a "quorum" concept. In one embodiment, a CTR on each node maintains a cluster-wide flag, or "quorum token," that expires if not refreshed periodically to protect against the process failing and the cluster assuming that it had a token that it no longer should own. The services from the cluster site depend on the token being set.

Figure 1:
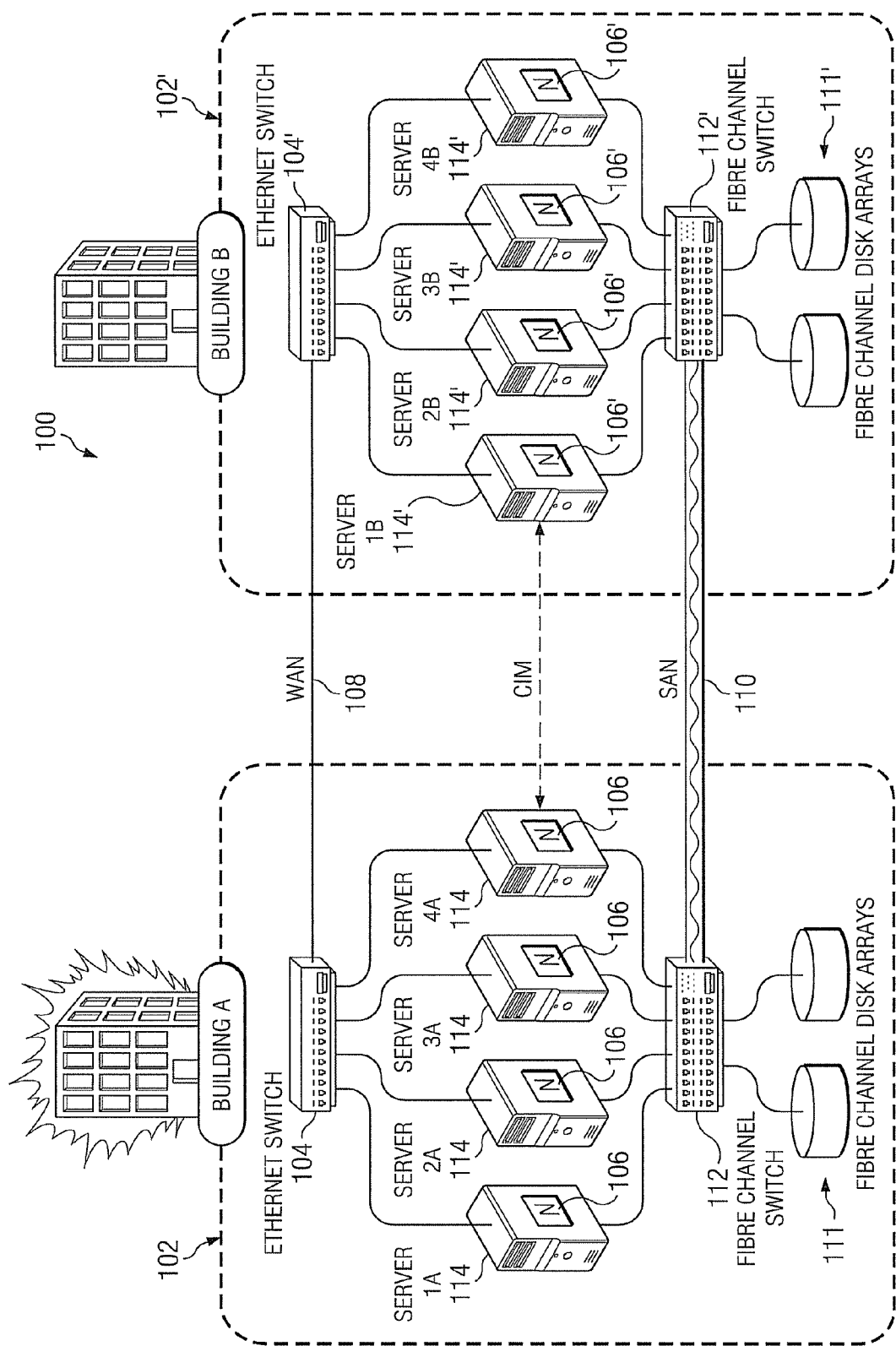
FIG. 1 illustrates a BCC system 100 comprising a split site cluster for implementing a cluster token register process ("CTR") in accordance with one embodiment.

FIG. 1 illustrates a BCC system 100 comprising a split site cluster. In particular, a single cluster is dispersed across two geographically distant sites 102, 102'. It will be recognized that the cluster may be spread across more or fewer sites. The site 102 includes an Ethernet switch 104 for connecting a plurality of servers, or nodes, 114, to a wide area network ("WAN") 108. The nodes 114 are connected to a storage area network ("SAN") 110 via a fiber channel switch 112. Similarly, the site 102' includes an Ethernet switch 104' for connecting a plurality of servers, or nodes, 114', to the wide area network ("WAN") 108. The nodes 114' are connected to the storage area network ("SAN") comprising a fiber channel 110 and multiple fiber channel disk arrays 111, 111', via a fiber channel switch 112'.

In accordance with features of one embodiment, each node 114 at the site 102 includes a cluster token registry process ("CTR") 106 executing thereon in a manner to be described; similarly, each node 114' at the site 102' includes a CTR 106' executing thereon. It will be recognized that each of the CTRs 106, 106' may comprise software instructions stored on at least one computer readable medium executable a respective one of the nodes 114, 114'.

All of the CTRs at a site, such as the CTRs 106 at the site 102, communicate with each other using a virtual synchrony protocol ("VSP") provided by the cluster infrastructure. As will be recognized by those of ordinary skill in the art, using VSP, each of the CTRs multicasts messages to the group of CTRs, thereby guaranteeing that each member receives an identically ordered stream of messages. To obtain consistent behavior, each member acts on messages in the order they are received members send their own messages to the group but do not act on them until they are self-delivered back.

Referring now for the sake of example solely to the cluster 102, each CTR 106 maintains a list of defined cluster-wide tokens, which may be used for a variety of purposes, such as that described in U.S. patent application Ser. No. 12/495,059, now U.S. Pat. No. 7,925,761, entitled SYSTEM AND METHOD FOR IMPLEMENTING A DEAD MAN DEPENDENCY TECHNIQUE FOR CLUSTER RESOURCES, which is assigned to the assignee of the present application and is hereby incorporated by reference in its entirety. Associated with each such token is a precondition required in order for the token to be granted (e.g., a number of votes required to make a quorum) and a maximum age per vote prior to expiry thereof. This "maximum age" may be pre-configured for certain special tokens or may be dynamically configured by client processes. In operation, a client process signs in, or "registers," with the CTR on its local node. If the client process would like to contribute, refresh, or retract a vote towards a specific token, it sends an appropriate message to the CTR. It will be noted that client processes must periodically refresh their vote in order to prevent their vote, and hence the associated token, from expiring. Upon receipt of the message, the CTR sends the message as an ordered message to the ring of CTRs. When a CTR notices that a token has expired, i.e., because one of the votes has expired, it sends a message to the ring of CTRs informing them of this result and retracting the vote. The VSP of the communication medium then ensures that all CTRs reach the same decision. Upon receipt of a message, each CTR determines whether the implication of the message is a change of token state; that is, whether the threshold of the minimum number of votes required for the token has been crossed, and sends a message to all client process informing them of the state change, if any. This message includes token name and the processes/nodes that contributed a vote toward it. If a CTR receives a message to retract an already retracted vote, which could happen if several CTRs notice in parallel that a vote expired, the CTR silently discards the message. VSP guarantees that all CTRs see all messages in the same order, ensuring a consistent decision across the cluster. To map basic quorum to this model, each CTR contributes one vote to the "quorum", with an expected vote count of $(N/2)+1$, where N is maximum number of possible CTR processes. Typically, N is pre-configured and set at the same time as other token attributes during registration of the token. The period before process votes expire serves to dampen quorum transitions.

Figure 2:
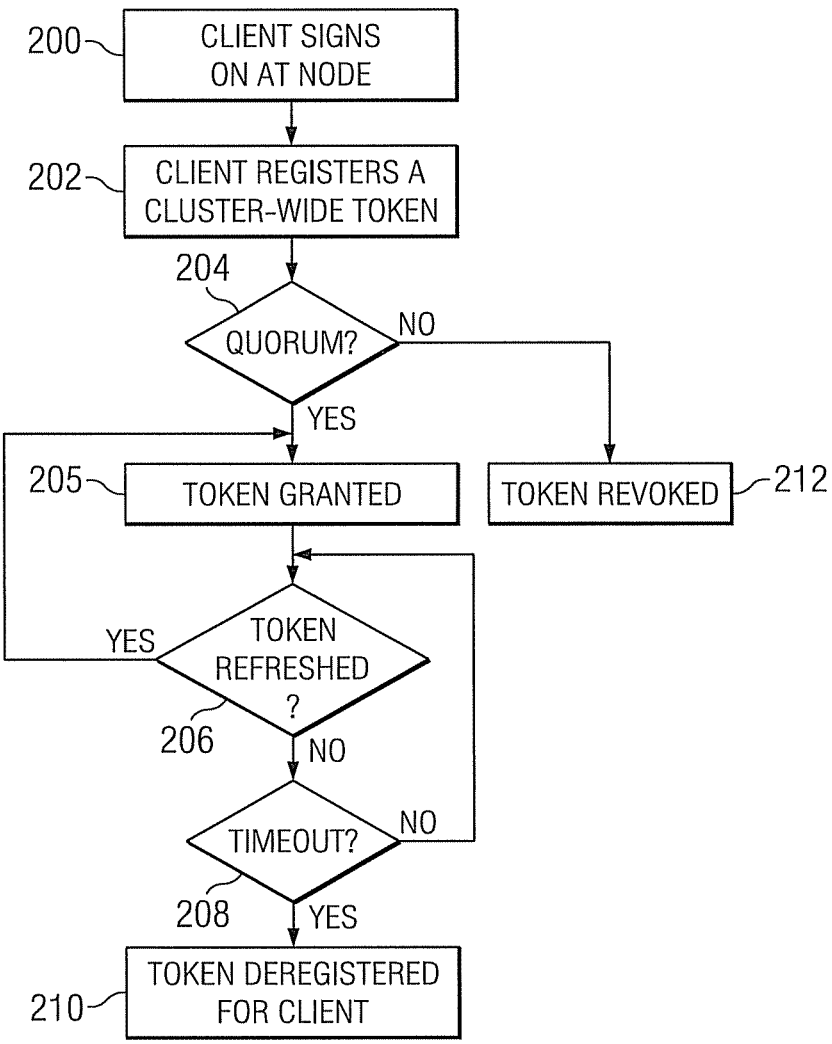
FIG. 2 illustrates operation of each of the CTRs of FIG. 1 in accordance with one embodiment.

FIG. 2 illustrates operation of each of the CTRs at each node in accordance with one embodiment. Step 200 occurs responsive to a new client signing in on the node. In step 202, the client registers a cluster-wide token, for example, "quorum token." As used herein, registering a token constitutes a vote in connection with the token. In step 204, the prerequisites quorum token are checked and a determination is made whether the prerequisites have been met. In particular, a determination is made in step 204 whether the calculation of votes for the quorum token has been met. If it is determined that the token prerequisites have been met, the token is deemed granted in step 205 and execution proceeds to step 206, in which a determination is made whether the token has been refreshed by the client. As used herein, refreshing the token is equivalent to refreshing the node's vote in connection with the token. If so, execution returns to step 204; otherwise, execution proceeds to step 208, in which a determination is made whether a timeout has occurred. If not, execution returns to step 206; otherwise, execution proceeds to step 210. In step 210, the token is de-registered for the client, at which point execution returns to step 204. If it is determined in step 204 that the token prerequisites have not been met, the token is revoked in step 212.

Figure 3:
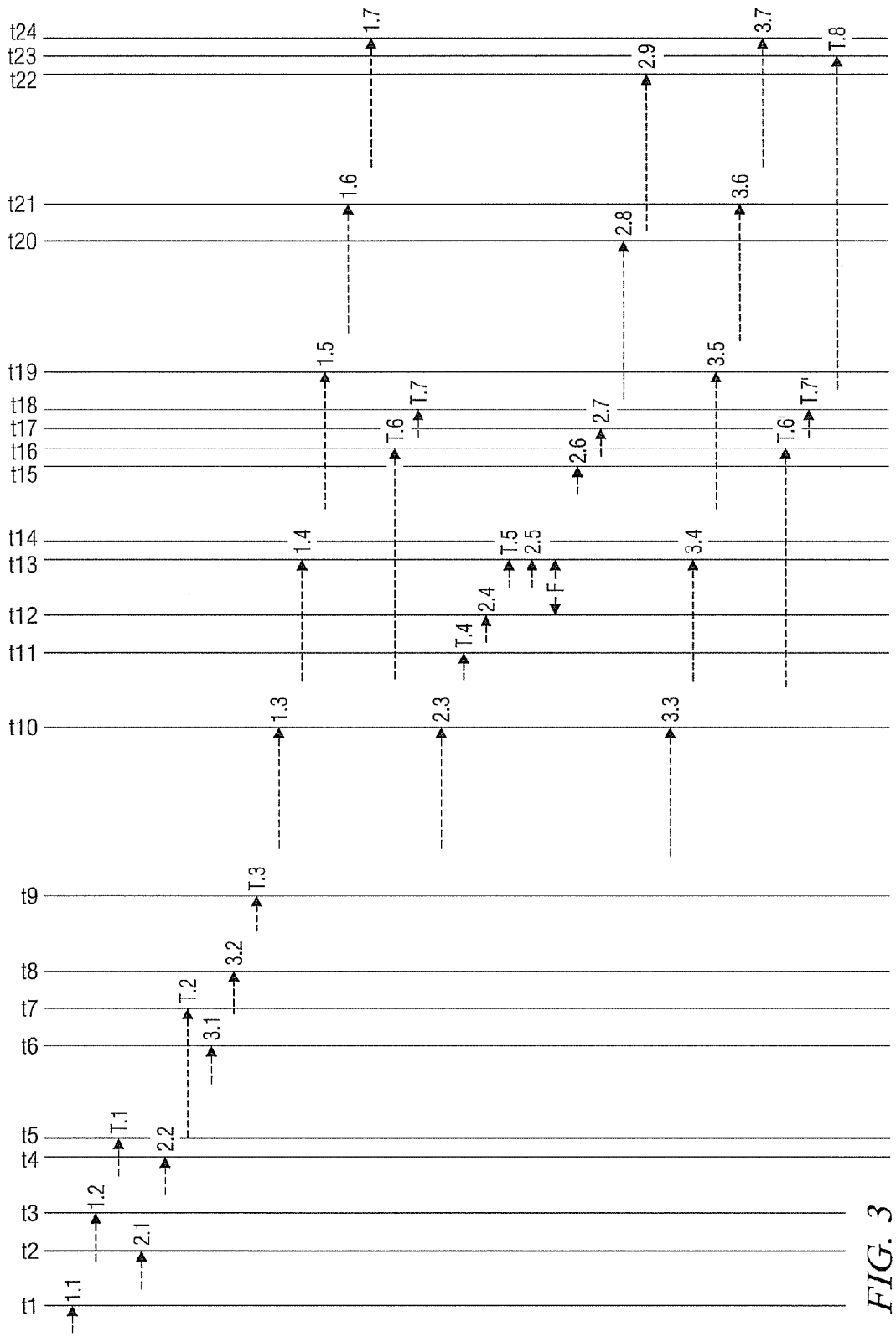
FIG. 3 is an exemplary operational scenario in accordance with one embodiment.

FIG. 3 illustrates an exemplary scenario in accordance with one embodiment. Each event occurring at Node 1 is designated by a reference numeral 1.x. Similarly, each event occurring at Nodes 2 and 3 is designated by a reference numeral 2.x, 3.x, respectively. Finally, each event occurring relative to a token registry is designated by a reference numeral T.x. Referring to FIG. 3, at a time t1, an event 1.1 occurs, at which a client signs in at node 1. At a time t2, an event 2.1 occurs, at which a client signs in at node 2. At a time t3, an event 1.2 occurs, at which the client at node 1 registers a cluster-wide token designated "quorum." For purposes of example, it will be assumed that the token requires at least 2 votes, token_refresh is set to 5 seconds, token_timeout is set to 10 seconds, and token_delay is set to 15 seconds. Token_refresh specifies how often the token must be refreshed by the node to avoid revocation. Token_delay specifies the delay between the token's conditions being satisfied and the actual token grant. Token_timeout is the interval after which a node's quorum token "vote" (e.g., event 3.2) is deemed lost or withdrawn (e.g., event T.6). At a time t4, an event 2.2 occurs, at which the client at node 2 registers the quorum token described above. At a time t5, an event T.1 occurs, at which time the token's pre-conditions are met. However the token is not yet granted due to the delay introduced by token_delay."

At a time t6, an event 3.1 occurs, at which a client signs in at node 3. At a time t7, an event T.2 occurs, at which the quorum token is granted after expiration of token_delay (i.e., 15 seconds) and is "owned" by two nodes; i.e., nodes 1 and 2. At a time t8, an event 3.2 occurs, at which the client at node 3 registers the quorum token. At a time t9, an event T.3 occurs, at which the quorum token is retained and is owned by the three nodes (nodes 1, 2, and 3).

At a time t10, events 1.3, 2.3, and 3.3 occur, at which the client at each of the nodes 1, 2, and 3 refresh the token upon expiration of the time period token_refresh. At a time t11, an event T.4 occurs, at which the quorum token is retained by the three nodes. At a time t12, an event 2.4 occurs, at which the client at node 2 de-registers the quorum token. Subsequent to the time t12 but before a time t13, a fault event <F> occurs, separating node 1 from nodes 2 and 3.

At a time t13, an event 2.5 occurs, at which the client at node 2 signs out. Also at time t13, an event T.5 occurs, at which the quorum token is retained and owned by nodes 1 and 3. At a time t14, an event 1.4 occurs, at which the client at node 1 refreshes the quorum token. Also at a time t14, an event 3.4 occurs, at which the client at node 3 refreshes the quorum token. At a time t15, an event 2.6 occurs, at which the client at node 2 signs in again. Shortly thereafter, at a time t16, an event T.6 occurs, at which the token vote for the client at node 3 times out after expiration of token_timeout, and an event T.6' occurs, at which the token vote for the client at node 1 times out after expiration of token_timeout. At a time t17, an event 2.7 occurs, at which the client at node 2 registers the quorum token. At a time t18, an event T.7 occurs, at which the quorum token is revoked with respect to node 1, and an event T.7' occurs, at which the quorum token is revoked with respect to node 3. At a time t19, an event 3.5 occurs, at which the client at node 3 refreshes the token. Also at time t19, an event 1.5 occurs, at which the client at node 1 refreshes the token; however, as node 1 was separated from nodes 2 and 3 by the fault <F>, the node 1's client's vote is refreshed in node 1's token registry, which is not "seen" at nodes 2 and 3. Similarly, node 1 does not "see" the token registries for nodes 2 and 3.

At a time t20, an event 2.8 occurs, at which the client at node 2 refreshes the quorum token. At a time t21, an event 3.6 occurs, at which the client at node 3 refreshes the token. Simultaneously, at the time t21, an event 1.6 occurs, at which the client at node 1 refreshes the token at node 1's token registry; however, as described above, the token registries of nodes 2 and 3 do not "see" node 1's refresh of the token. At a time t22, an event 2.9 occurs, at which the client at node 2 refreshes the quorum token. At a time t23, an event T.8 occurs, at which the quorum token is granted after expiration of token_delay and is owned by nodes 2 and 3. Finally, at a time t23, events 1.7 and 3.7 occur. At event 1.7, at which the client at node 1 refreshes the token; however, as described above, the token registries of nodes 2 and 3 do not "see" node 1's refresh of the token. Similarly, at event 3.7, the client at node 3 refreshes the quorum token.

While the preceding description shows and describes one or more embodiments, it will be understood by those skilled in the art that various changes in form and detail may be made therein without departing from the spirit and scope of the present disclosure. For example, various steps of the described methods may be executed in a different order or executed sequentially, combined, further divided, replaced with alternate steps, or removed entirely. In addition, various functions illustrated in the methods or described elsewhere in the disclosure may be combined to provide additional and/or alternate functions. Therefore, the claims should be interpreted in a broad manner, consistent with the present disclosure.

What is claimed is:

1. A cluster token registry ("CTR") method comprising:
registering a cluster-wide token with a CTR associated with a node of a plurality of interconnected nodes in a cluster, the registering being performed by a client in response to the client signing in at one of the nodes;
determining whether prerequisites for granting the token have been met by determining whether a required number of votes are currently cast in connection with the token;
responsive to a determination that the prerequisites have been met, granting the token;
periodically determining whether the vote in connection with the token vote has been refreshed by the client; and
responsive to a determination that the vote in connection with the token vote has not been refreshed by the client, de-registering the client,
wherein the registering comprises setting at least one of a quorum parameter, a token_delay parameter, a token_refresh parameter, and a token_timeout parameter, and
wherein the vote in connection with the token vote is refreshed by the client independent of communication from the CTR associated with the node.

2. The method of claim 1 further comprising, responsive to a determination that the prerequisites have not been met, revoking the token.

3. The method of claim 1 wherein the required number of votes is equal to (N/2)+1, wherein N is equal to a maximum number of the nodes of the cluster.

4. The method of claim 1 wherein the token_delay parameter specifies a time delay between a time at which the token prerequisites are met and a time at which the token is granted.

5. The method of claim 1 wherein the token_timeout parameter specifies a time delay between a time at which the vote in connection with the token was last refreshed and a time at which the vote in connection with the token is deemed withdrawn.

6. The method of claim 1 wherein the token_refresh parameter specifies a frequency with which the vote in connection with the token must be refreshed to avoid being deemed withdrawn.

7. A system comprising:
a cluster comprising a plurality of interconnected nodes each having a cluster token registry ("CTR") process associated therewith;
a CTR of a node of the plurality of interconnected nodes responsive to a client signing in at the node causing the client to register a cluster-wide token with the CTR of the node, thereby casting a vote in connection with the token;
the CTR of the node determining whether prerequisites for granting the token have been met by determining whether a required number of votes are currently cast in connection with the token;
the CTR of the node responsive to a determination that the prerequisites have been met granting the token;
the CTR of the node periodically determining whether the vote in connection with the token vote has been refreshed by the client;
the CTR of the node responsive to a determination that the vote in connection with the token has not been refreshed by the client de-registering the client,
wherein the vote in connection with the token vote is refreshed by the client independent of communication from the CTR of the node.

8. The system of claim 7 further comprising the CTR of the node responsive to a determination that the prerequisites have not been met revoking the token.

9. The system of claim 7 wherein the required number of votes is equal to (N/2)+1, wherein N is equal to a maximum number of the nodes of the cluster.

10. The system of claim 7 wherein registering comprises setting at least one of a quorum parameter, a token_delay parameter, a token_refresh parameter, and a token_timeout parameter.

11. The system of claim 10 wherein the token_delay parameter specifies a time delay between a time at which the token prerequisites are met and a time at which the token is granted, the token_timeout parameter specifies a time delay between a time at which the vote in connection with the token was last refreshed and a time at which the vote in connection with the token is deemed withdrawn, and the token_refresh parameter specifies a frequency with which the vote in connection with the token must be refreshed to avoid being deemed withdrawn.

12. A computer program product comprising non-transitory computer-readable medium having stored thereon instructions executable by a computer for implementing a cluster token registry ("CTR") process in a cluster comprising a plurality of interconnected nodes each having a CTR associated therewith, the instructions executable by the computer for causing the computer to:
responsive to a client signing in at one of the nodes, causing the client to register a cluster-wide token with the CTR of the node, thereby casting a vote in connection with the token;
determine whether prerequisites for granting the token have been met by determining whether a required number of votes are currently cast in connection with the token;
grant the token responsive to a determination that the prerequisites have been met;
periodically determine whether the vote in connection with the token vote has been refreshed by the client; and
de-register the client responsive to a determination that the vote in connection with the token has not been refreshed by the client,
wherein the vote in connection with the token vote is refreshed by the client independent of communication from the CTR of the node.

13. The computer program product of claim 12 wherein the instructions further cause the computer to revoke the token responsive to a determination that the prerequisites have not been met.

14. The computer program product of claim 12 wherein the required number of votes is equal to (N/2)+1, wherein N is equal to a maximum number of the nodes of the cluster.

15. The computer program product of claim 12 wherein the instructions for causing the computer to register the client further comprise instructions for causing the computer to set a token_delay parameter.

16. The computer program product of claim 15 wherein the token_delay parameter specifies a time delay between a time at which the token prerequisites are met and a time at which the token is granted.

17. The computer program product of claim 12 wherein the instructions for causing the computer to register the client further comprise instructions for causing the computer to set a token_refresh parameter.

18. The computer program product of claim 17 wherein the token_refresh parameter specifies a frequency with which the vote in connection with the token must be refreshed to avoid being deemed withdrawn.

19. The computer program product of claim 12 wherein the instructions for causing the computer to register the client further comprise instructions for causing the computer to set a token_timeout parameter.

20. The computer program product of claim 19 wherein the token_timeout parameter specifies a time delay between a time at which the vote in connection with the token vote was last refreshed and a time at which the vote in connection with the token vote is deemed withdrawn.

\* \* \* \* \*